(12) United States Patent
Bartz et al.

(10) Patent No.: US 11,173,799 B2
(45) Date of Patent: Nov. 16, 2021

(54) METHOD FOR GUIDING A MOTOR VEHICLE INTO A CHARGING POSITION AT AN INDUCTIVE CHARGING STATION, AND CONTROL DEVICE AND MOTOR VEHICLE

(71) Applicant: CPT GROUP GMBH, Hannover (DE)

(72) Inventors: Stephan Bartz, Thumhausen (DE); Thomas Roehrl, Barbing (DE)

(73) Assignee: CPT Group GmbH, Hannover (DE)

( * ) Notice: Subject to any disclaimer, the term of this patent is extended or adjusted under 35 U.S.C. 154(b) by 386 days.

(21) Appl. No.: 16/347,636

(22) PCT Filed: Oct. 9, 2017

(86) PCT No.: PCT/EP2017/075594
§ 371 (c)(1),
(2) Date: May 6, 2019

(87) PCT Pub. No.: WO2018/082867
PCT Pub. Date: May 11, 2018

(65) Prior Publication Data
US 2019/0315244 A1 Oct. 17, 2019

(30) Foreign Application Priority Data

Nov. 7, 2016 (DE) .................... 10 2016 221 732.1

(51) Int. Cl.
*H02J 7/00* (2006.01)
*B60L 53/60* (2019.01)
(Continued)

(52) U.S. Cl.
CPC ............ *B60L 53/60* (2019.02); *B60L 53/38* (2019.02); *B60L 50/61* (2019.02); *B60L 2240/32* (2013.01);
(Continued)

(58) Field of Classification Search
USPC ....................................... 320/137, 109, 134
See application file for complete search history.

(56) References Cited

U.S. PATENT DOCUMENTS 9,876,370 B2 * 1/2018 Yamamura ............ H02J 7/0027
10,177,593 B2 1/2019 Turner et al.
(Continued)

FOREIGN PATENT DOCUMENTS

AU 2014218477 A1 9/2014
DE 102014213195 A1 1/2016
(Continued)

*Primary Examiner* — Alexis B Pacheco
(74) *Attorney, Agent, or Firm* — Laurence A. Greenberg; Werner H. Stemer; Ralph E. Locher

(57) ABSTRACT

A method for guiding a motor vehicle into a charging position at an inductive charging station. When the charging position is being approached, a control device of the motor vehicle determines a relative position of the motor vehicle with respect to the charging position at least up to a first distance from the charging station by way of a first location-determining device and, starting from a second distance from the charging station up to the charging position by way of a second location-determining device. The control device estimates the relative position at least in a transition region between the first distance and the second distance on the basis of the motor vehicle's own movement, by way of an odometry device.

12 Claims, 3 Drawing Sheets

(51) Int. Cl.
*B60L 53/38* (2019.01)
*B60L 50/61* (2019.01)

(52) U.S. Cl.
CPC ....... *B60L 2240/62* (2013.01); *B60L 2250/16* (2013.01)

(56) References Cited

U.S. PATENT DOCUMENTS

| | | |
|---|---|---|
| 10,612,262 B2 * | 4/2020 | Katanoda .................. E04H 6/42 |
| 2012/0262002 A1 | 10/2012 | Widmer et al. |
| 2014/0132207 A1 | 5/2014 | Fisher |
| 2014/0152268 A1 | 6/2014 | Lowenthal et al. |
| 2016/0075239 A1 | 3/2016 | Briz et al. |
| 2016/0082848 A1 | 3/2016 | Ichikawa et al. |
| 2016/0339792 A1 * | 11/2016 | Khoo ...................... B60L 53/68 |
| 2017/0174093 A1 | 6/2017 | Oettle et al. |
| 2017/0182912 A1 * | 6/2017 | Simonini .............. B60L 53/305 |
| 2017/0276787 A1 | 9/2017 | Rink |
| 2017/0282735 A1 * | 10/2017 | Yamamura ............ H02J 7/0045 |
| 2018/0111492 A1 * | 4/2018 | McCool .................. B60L 53/12 |

FOREIGN PATENT DOCUMENTS

| | | |
|---|---|---|
| DE | 102015216899 A1 | 3/2016 |
| WO | 2015051876 A1 | 4/2015 |
| WO | 2016062553 A1 | 4/2016 |
| WO | 2016098050 A1 | 6/2016 |
| WO | 2016102143 A1 | 6/2016 |

\* cited by examiner

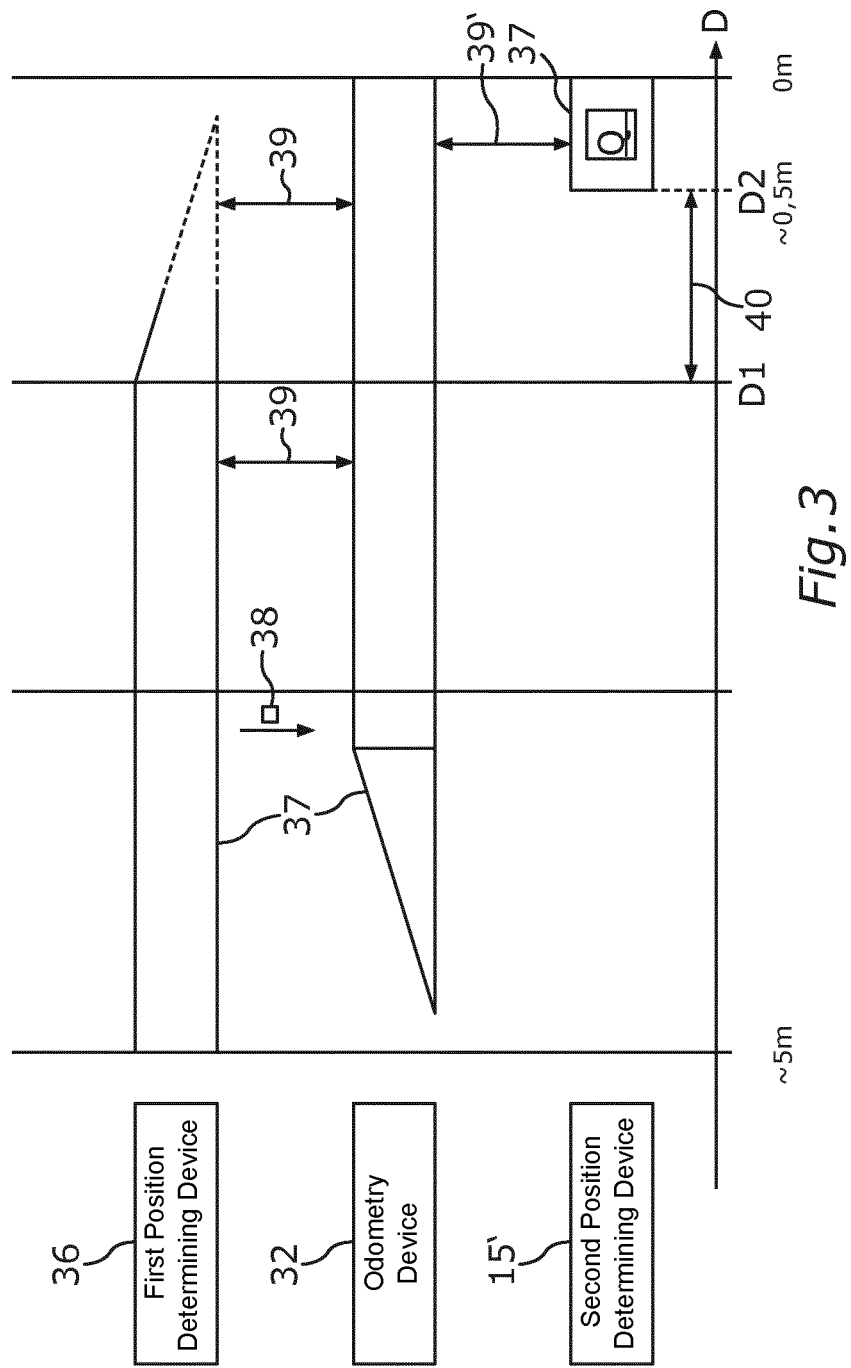

METHOD FOR GUIDING A MOTOR VEHICLE INTO A CHARGING POSITION AT AN INDUCTIVE CHARGING STATION, AND CONTROL DEVICE AND MOTOR VEHICLE

BACKGROUND OF THE INVENTION

Field of the Invention

The invention relates to a method for directing or guiding a motor vehicle into a charging position. The charging position must be assumed by the motor vehicle at an inductive charging station in order to receive energy from the charging station. The motor vehicle can be an electrically driven motor vehicle or a hybrid vehicle. The invention also includes a control device by means of which the method can be carried out in a motor vehicle. Finally, the invention also comprises a motor vehicle with the control device according to the invention.

In order to be able to charge an inductively charging motor vehicle, the motor vehicle must look for a corresponding parking space which provides such a charging option, for example in the form of a transmission coil in the ground. Since a magnetic field is deployed between the transmission coil of the charging station and the reception coil of the motor vehicle and said magnetic field can be very large depending on the electrical power to be transmitted, it is important to avoid the field from escaping between the coils, since otherwise irradiation of the magnetic field into the surroundings occurs and as a result, for example, induction currents can induce dissipated power in other electrically conductive objects. In order to maintain the charging power capability and for the sake of a good efficiency level, it is also important for the positioning to be as accurate as possible.

In order to minimize the undesired irradiation of a magnetic field, accurate positioning of the reception coil on the transmission coil is necessary. The greater the offset with which the two coils are arranged one on top of the other, the greater the loss of the energy transmission, i.e. the coupling factor between the two coils drops, and therefore also the efficiency level. The undesired stray field is increased to the same extent.

Correspondingly, a precise positioning system is necessary for the motor vehicle. Visual determination of the location of the transmission coil proves unreliable insofar as the charging station is frequently made available in the open air and therefore the visual appearance of the charging station can be changed by environmental influences, for example by snowfall or fall foliage. In addition, the baseplate with the transmission coil is adapted to the appearance of the parking area (the same surface finish) and therefore cannot be differentiated from the underlying surface by a camera system.

Furthermore, it is technically very complex to make available a location-determining system by means of which the transmission coil can be detected from a sufficiently large distance from the motor vehicle and then can also be located with the necessary spatial resolution or detection accuracy even after the transmission coil is reached. This requires, specifically, on the one hand a large location-determining range and, on the other hand, accurate or high spatial resolution. This is technically very complex to make available with a single location-determining device. Furthermore, many location-determining systems, such as for example GPS (Global Positioning System), do not function in multistory car parks and garages.

Document US 2012/0262002 A1 discloses, for the positioning of a motor vehicle with respect to a ground-mounted coil of a charging station, a detection device which is based on magnetic measurement of the ground-mounted coil. However, the range of this location-determining device is limited to a few centimeters.

BRIEF SUMMARY OF THE INVENTION

The invention is based on the object of inductively charging a motor vehicle at a charging station by guiding or directing said motor vehicle into a predetermined charging position provided for charging.

The object is achieved by means of the subjects of the independent patent claims. Advantageous developments of the invention are described by the dependent patent claims, the following description and the figures.

The invention makes available a method for guiding the motor vehicle into the charging position at the inductive charging station. The method can be carried out by means of a control device which can be made available in the motor vehicle.

When the charging station is approached, a relative position of the motor vehicle with respect to the charging station is determined by means of a first location-determining device. The first location-determining device is used here at least up to a first distance from the charging station. In other words, by means of the first location-determining device the motor vehicle can be made to approach the charging position, for example up to the first distance, e.g. up to 1 m. Finally, starting from a second distance from the charging station, the relative position is determined by means of a second location-determining device until the charging position is reached. The two location-determining devices differ e.g. in that the first location-determining device has a different location-determining range and/or different location-determining accuracy and/or different measuring principle (different location-determining technology) than the second location-determining device. With the first location-determining device it is possible to determine the relative position from, for example, a relatively large distance, and the motor vehicle can therefore be directed or guided at least as far as the first distance. Starting from the second distance, the second locating-device is then used until the charging position is reached. A further difference between the two location-determining devices can also be that the first location-determining device can have a lower spatial resolution or distance resolution than the second location-determining device. In other words, the location-determination by means of the first location-determining device is then coarser or less accurate or subject to a higher degree of variance than that of the second location-determining device.

It is to be noted here that the first distance and the second distance can be equal or different. If the first distance is shorter than the second distance, an overlapping region is produced in which both the first location-determining device and the second location-determining device can be used. If the first distance is, on the other hand, larger than the second distance, there is a resulting detection gap within which the motor vehicle has to be guided without the second location-determining device. The first distance can also be 0, i.e. the first location-determining device can also be used continuously or constantly.

In order to be able to link the two location-determining devices to one another, at least in one transition region between the first distance and the second distance the relative position of the motor vehicle with respect to the charging position is estimated by means of an odometry device on the basis of the motor vehicle's own movement. The transition region can therefore be said overlapping region (first distance is shorter than the second distance) or the location-determining gap (first distance is greater than the second distance). The two location-determining devices can be compared with one another by means of the odometry device, with the result that the motor vehicle can be continuously directed or guided, wherein the process can be started at a distance which is greater than the first distance. A guiding signal is therefore made available throughout as far as the charging position. The odometry device can therefore be operated simultaneously with at least one of the two location-determining devices and its operation can be coupled to said devices, as will be described further below.

The invention provides the advantage that different location-determining technologies in the form of the first location-determining device and the second location-determining device can be combined with one another in order as a result to guide the motor vehicle from a range which is greater than the first distance as far as the charging position, without having to make available a single, technically complex location-determining device for this purpose.

The invention also includes optional technical features which provide additional advantages.

In order to obtain a range of the method which is greater than 3 m, there is in particular provision that the first location-determining device determines said relative position in a radio-based fashion. This is independent of weather influences which could change e.g. the visual appearance of the charging station, for example independently of rain or snow or fallen leaves.

A particularly preferred embodiment of this radio-based location determination provides that the first location-determining device emits in each case a radio signal with a predetermined transmission field strength by means of two transmitter units. A distance between these two transmitter units is preferably greater than 50 cm, and in particular greater than 1 m. for example, the transmitter units could be arranged at a respective corner of the front of a vehicle, for example in the region of a respective front headlamp. Each radio signal is respectively emitted by one of the transmitter units. Each radio signal is received by a measuring receiver of the charging station, which receiver is in a predetermined relative position with respect to the charging position. The measuring receiver emits the measured values to the control device. The control device receives the respective value of the reception field strength of the radio signals from the measuring receiver. Since the transmission field strength is known, and the value of the reception field strength has been communicated by the measuring receiver, the control device can determine a distance of the measuring receiver from the respective transmitter units on the basis of the change in the field strength. Depending on the received values, the location of the measuring receiver can therefore be determined overall on the basis of a trilateration. Since the relative position of the measuring receiver with respect to the charging position is also known, as a result said relative position of the motor vehicle with respect to the charging position can also be determined by this means. By means of such location determination, location of the charging position can be determined with spatial resolution or spatial accuracy which can be in a range from 1 cm to 30 cm—and this can be done over a distance of more than 3 m, for example 5 m. said position-determining accuracy is, however, generally not sufficient or not reliable enough under all circumstances (e.g. for the avoidance of external faults) to arrange a reception coil of a motor vehicle with a sufficiently high coupling factor to a transmission coil of the charging station.

The second location-determining device therefore preferably uses measurement with a relatively high positional accuracy. This measurement accurately determines this coupling factor of the inductive coupling, in order therefore to be able to set said factor particularly accurately. The second location-determining device therefore generates a measuring signal or coupling signal which is dependent on the coupling factor between the reception coil of the motor vehicle and the transmission coil of the charging station. The coupling signal can be determined, for example, by generating an alternating current in one of the coils and recording an induction voltage, generated by said alternating current, in the other coil. An evaluation of an absolute value of the induction voltage or else only a relative change therein can be determined here. The valuation of the absolute value presupposes a known transmission power of the coil with the impressed alternating current. The evaluation of the relative change can be carried out in an iterative method until a predetermined optimization criterion is reached. Overall, in this context the relative position is determined here during the motor vehicle's own movement, on the basis of the gradient of the coupling signal. The gradient indicates here the direction in which the motor vehicle has to be moved in order to increase the coupling factor. The second location-determining device can as a result have a positional accuracy in a range from 0.5 cm to 5 cm.

A relative change in position of the motor vehicle, which results from the motor vehicle's own movement can be detected by means of the intermediately connected odometry device. The odometry device can read out here rotational position sensors of wheels of the motor vehicle and/or a steering wheel angle of the motor vehicle and/or a rotary position encoder of an electric machine, by means of which the motor vehicle is driven, and/or at least one further motor vehicle sensor (e.g. yaw rate sensor). So that the odometry device can actually use the determined movement of the motor vehicle to cause the motor vehicle to move closer to the charging position, the odometry device must also be configured or initialized with respect to an initial position or starting position. For this purpose there is preferably provision that before the first distance is reached, that is to say while the first location-determining device is still being used, a relative position of the charging position, determined by the first location-determining device, is received as an initial estimate from the odometry device. The odometry device therefore continues the determination of the relative position of the updating of the relative position at the location where the first detection device stops.

Until the first distance is reached, or at least before it is reached, an interplay or interaction between the first location-determining device and the odometry device can also be used to compensate faults during the location determination. It is therefore possible to provide for a change in the relative position, determined by the first location-determining device, to be checked for a predetermined plausibility criterion by means of the odometry device on the basis of the determined movement of the vehicle. If, for example, a sudden or step-shaped change occurs in the estimated relative position in the first location-determining device, while no corresponding movement of the motor vehicle itself has been detected by the odometry device, it is to be assumed that the first location-determining device was disrupted, for example, during the radio reception. Then, this disrupted estimate or determination of the relative position in the first location-determining device can be rejected or deleted. Likewise, for example in the case of a wheel skidding, the odometry device can conversely detect a suspected actual movement of the motor vehicle which has not taken place. This can be verified or detected on the basis of the first location-determining device. The plausibility criterion can state, for example, that both devices (location determination and odometry) each have to determine a change in the relative position which may change at maximum by a predetermined interval value, for example in a range from 1 cm to 30 cm. Otherwise, e.g. the estimation with the relatively small change in value and/or the smallest change in direction can be used.

The second location-determining device can, as already mentioned, have a positional accuracy in a range from 0.5 cm to 5 cm. If one relies here, for example, on detection of the coil field of the transmission coil, the disadvantage can arise that although a distance from the charging position is known, the direction in which it is located is not known. Therefore, on the one hand a combination of a distance indication and a direction indication can be determined as a "relative position", or, for example, just a distance indication or just a direction indication can also be determined.

During the determination of the coupling factor, e.g. only the relative distance is determined without the distance in which the motor vehicle has to be moved for this distance to be able to be reduced being known. On the basis of the gradient only along the previously travelled-along driving curve it can be decided whether forward or rearward travel is necessary. Therefore, there is preferably provision that after the second distance is undershot, the second location-determining device determines a distance to the charging position, or said coupling factor, but then the direction with respect to the charging position is then determined for spatial orientation by means of the odometry device. For example, by means of the odometry device the motor vehicle can be directed or guided in different, in particular opposing and/or perpendicular directions, and it can then be respectively checked by means of the second location-determining device how the coupling factor changes and as a result the gradient can be determined not only along the driving line but also in a horizontal X-Y plane. Likewise, the distance from the charging position can be determined not only along the driving line but also by changing the position of the motor vehicle in the X and Y directions, and as a result the distance from the charging position can be minimized.

A radio-based location-determining method, such as has been described with respect to the first location-determining device, can nevertheless have a range around less than 10 m. In order to increase the range even further, there is particularly preferably provision that the control device of the motor vehicle determines the presence of the charging station on the basis of a radio signal of a vehicle-external transmitter. For example, a WiFi (Wireless Fidelity) or WLAN (Wireless Local Area Network) transmitter can emit the radio signal in the vicinity of the charging station. The motor vehicle can then have a WLAN radio unit (transceiver unit) or a corresponding WLAN radio module for receiving the radio signal. The presence of a charging station can be signaled by the transmitter by means of the radio signal.

Therefore, the information that the charging station is in the vicinity is present in the motor vehicle. For example, an absolute geo-position of the charging station can then also be communicated by means of the radio signal. Such a geo-position can be described, for example, by means of geo-coordinates. This geo-position can then be driven to with an accuracy in a range of less than 12 m by the motor vehicle by means of a receiver of a position signal of a GNSS (Global Navigation Satellite System), for example of the GPS (Global Positioning System). If the distance from the charging position is then so short that the first position-determining device can be used, the motor vehicle can be guided as far as the charging position in the manner described.

Instead of the geo-position or in addition, the location of the actual transmitter, that is to say of the WiFi transmitter or WLAN transmitter, in the motor vehicle can also be determined on the basis of the radio signal. Location-determining methods for this purpose are known from the prior art. The motor vehicle can then firstly be guided in the direction of the transmitter until the first location-determining device determines the relative position of the charging station for the first time. The motor vehicle can then continue in the direction of the charging position.

In order to carry out the method according to the invention in a motor vehicle, the invention makes available a control device which can be coupled to the first location-determining device and to the second location-determining device and to the odometry device. The control device has a processor device which is configured to carry out an embodiment of the method according to the invention. The processor device can have, for this purpose, for example, a microcontroller or microprocessor and execute corresponding program code.

According to the invention, a motor vehicle is also made available with the first location-determining device, the second location-determining device and the odometry device and an embodiment of the control device according to the invention. The motor vehicle can be, for example, an automobile or an industrial truck.

The relative position of the charging position which is determined can be signaled in the motor vehicle, for example to a driver, that is to say, for example, visually on a display device and/or haptically, for example on a steering wheel. Acoustic indications can also be output to the driver. Additionally or alternatively to this, the relative position of the charging position can also be made available, for example by a closer driver assistance device which maneuvers the motor vehicle autonomously, i.e. without involvement by a driver, into the charging position.

BRIEF DESCRIPTION OF THE SEVERAL VIEWS OF THE DRAWING

An exemplary embodiment of the invention is described below. To this end, in the figures:

FIG. 3 shows a diagram illustrating a method which can be carried out by the motor vehicle in FIG. 1 in the situation illustrated in FIG. 2.

DESCRIPTION OF THE INVENTION

The exemplary embodiment explained below is a preferred embodiment of the invention. In the exemplary embodiment, the described components of the embodiment each constitute individual features of the invention which should be considered independently of one another and which in each case also develop the invention independently of one another and should therefore also be regarded as a constituent part of the invention individually or in a different combination to that shown. Furthermore, the embodiment described may also be supplemented by further features of the invention from among those that have already been described.

In the figures, functionally identical elements are in each case provided with the same reference signs.

Figure 1:
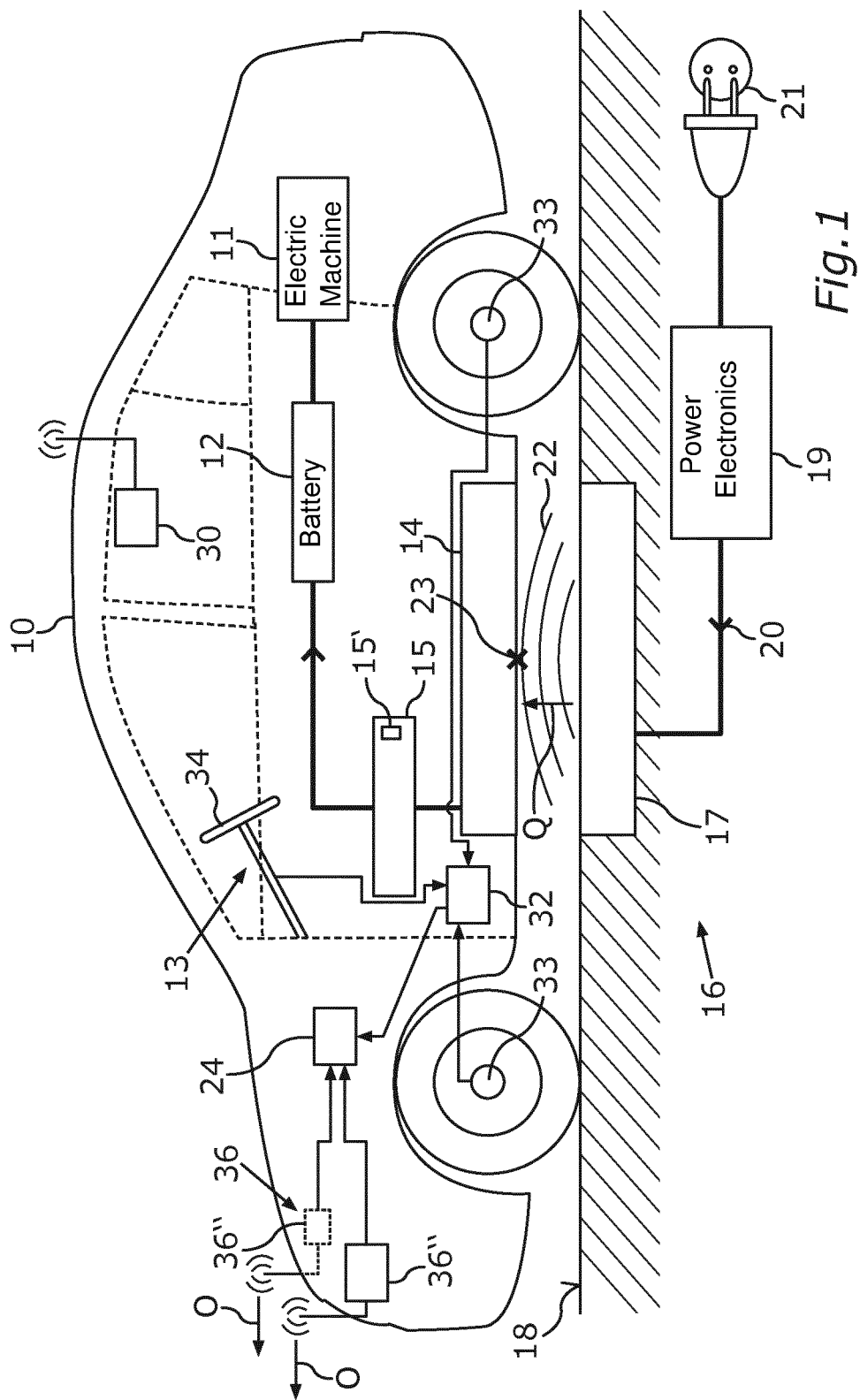
FIG. 1 shows a schematic illustration of an embodiment of the motor vehicle according to the invention.

FIG. 1 shows a motor vehicle 10 which may be, in particular, an automobile, for example a passenger car or a truck. The vehicle 10 can be an electric vehicle, that is to say can have as the drive an electric motor or generally an electric machine 11 which can be operated with electrical energy from a battery 12. An internal combustion engine (not illustrated) can optionally be provided for a hybrid drive.

In order to charge the battery 12 with the electrical energy, an inductive charging system 13 with a reception coil 14 and a charger 15 can be made available in a manner known per se. The reception coil 14 can, for example, be integrated into a vehicle floor of the motor vehicle 10. In order to charge the battery 12 at a charging station 16, the motor vehicle 10 can be parked with its reception coil 14 over a primary coil or transmission coil 17 of the charging station 16. In this case, the transmission coil 17 is then integrated into a floor or ground area 18. The transmission coil 17 can be operated or supplied with an alternating electric current 20 from a public electrical supply grid 21 by means of power electronics 19, in order to generate an alternating magnetic field 22 for the inductive charging in a manner known per se.

In order to avoid the stray losses during the transmission of the alternating field 22, a relative position of the reception coil 14 with respect to the transmission coil 17 is important insofar as the motor vehicle 10 is located with its reception coil 14 in a predetermined charging position 23 with respect to the transmission coil 14.

In order to ensure this, the motor vehicle 10 can be guided toward the charging station 16 by a control device 24 of the motor vehicle 10 and can be directed into the charging position 23 at said charging station 16.

Figure 2:
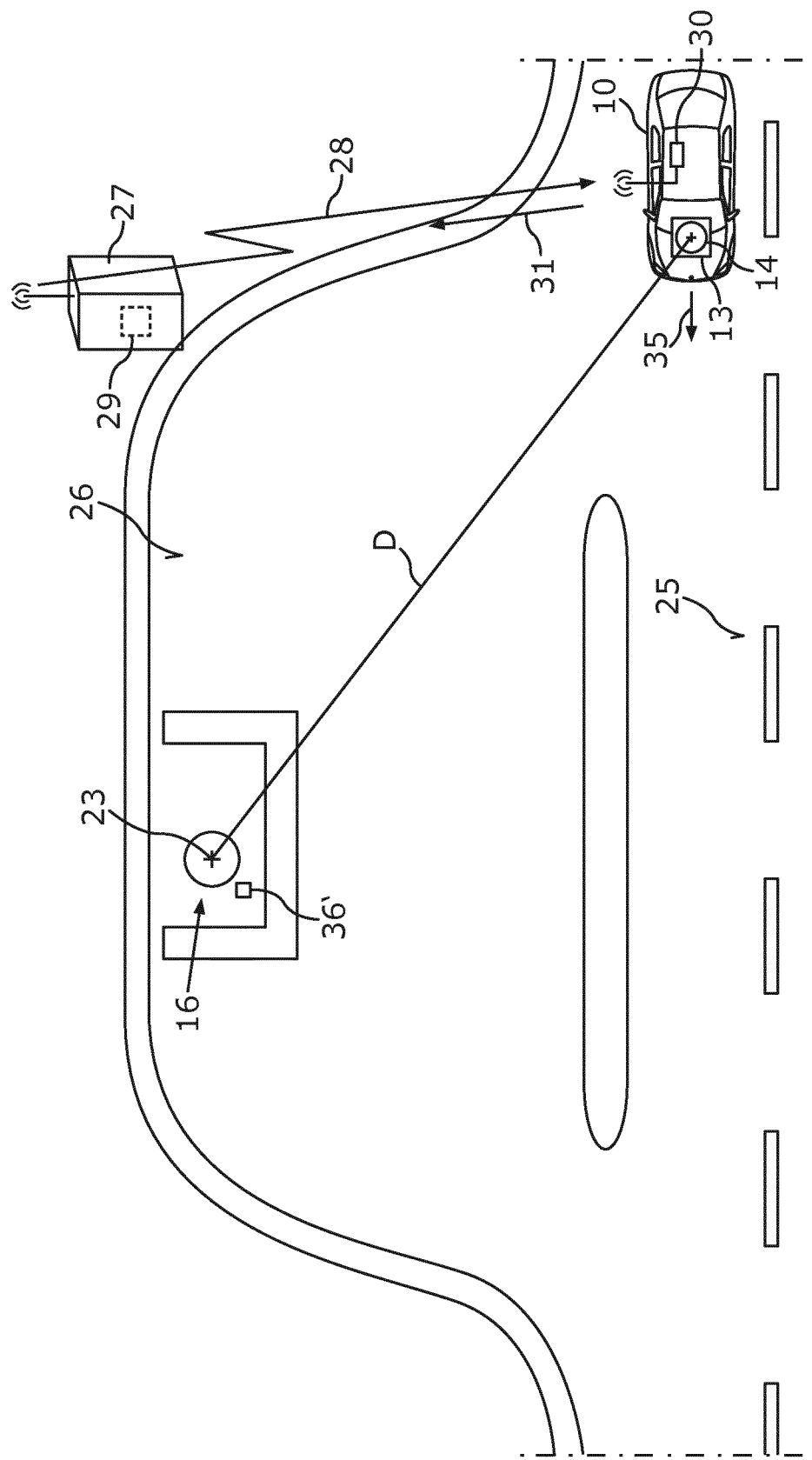
FIG. 2 shows a schematic illustration of a charging station at which the motor vehicle in FIG. 1 is guided into a charging position.

FIG. 2 illustrates an exemplary situation in which the control device 24 can execute a method for guiding the motor vehicle 10 into the charging position 23. A road 25 on which the motor vehicle 10 can drive is illustrated. The charging station 16 can be located in a parking area 26. The charging station 16 in the parking area 26 can include a transmitter 27 which can generate a radio signal 28 which can signal that a charging station 16 is located in the parking area 26.

The radio signal 28 can be generated, for example, by a WLAN radio module 29 of the transmitter 27. The motor vehicle 10 can have a WLAN transceiver unit 30, by means of which the radio signal 28 and, in particular, the direction of incidence or short direction 31 from which the radio signal 28 impinges on the transceiver unit 30, can be determined.

Furthermore, an odometry device 32 of the motor vehicle 10 can detect the vehicle's 10 own movement 35, for example on the basis of signals of rotational position sensors 33 and/or a steering wheel angle of the steering wheel 34. For example, rotational position sensors 33 of an ABS (anti-lock brake system) or of the electric machine 11 can be used.

Furthermore, a transmission quality level or a coupling factor Q for the transmission of the alternating field 22 from the transmission coil 17 to the reception coil 14 can be determined e.g. by the charger 15. For this purpose, a location-determining device 15' can be made available in the charger 15, which location-determining device 15' can be implemented, for example, on the basis of a program module for a processor device of the charger 15.

Furthermore, a location-determining device 36 can be made available which can determine the location of a measuring receiver 36' of the charging station 16. This can be carried out, for example, according to the radio key principle, wherein the location-determining device 36 can have two transmitter units 36" with each of which it is possible to emit a location-determining signal as a radio signal 0 which can be received by the measuring receiver 36'. By virtue of the fact that the measuring receiver 36' signals the received field strength of the radio signal 0 to the control device 24, the relative position of the motor vehicle 10 with respect to the measuring receiver 36' can be determined by said control device 24 by means of trilateration.

In order then to arrive at the charging position 23 starting from the position of the motor vehicle 10 on the road 25 (illustrated in FIG. 2), the motor vehicle can detect the approach to the charging station 16 by means of the WLAN radio signal 28 with a range of more than 10 m, in particular of more than 20 m, and can make contact with the transmitter 27 via the transceiver unit 30 by means of WiFi communication. The vehicle 10 can therefore drive to or approach the charging station 16 from the road 25 by means of the control device 24. As a result, a distance D of the motor vehicle 10 from the charging position 23 is therefore reduced. The relative distance D constitutes an aspect of the relative position.

Such a WiFi communication device does not necessarily have to be provided at each individual charging station 16. with this distance, it is also sufficient to equip the parking area 26 with a plurality of charging stations 16 and yet with just one transmitter 27 in the vicinity of the charging station 16. The accuracy of the position determination on the basis of a radio signal 28 can be in a range of up to 1 m.

FIG. 3 illustrates how, taking the above as a basis, the motor vehicle 10 can be guided further in the direction of the charging position 23 by the control device 24. In the illustrated diagram, activity phases 37 of the location-determining device 36, of the odometry device 32 and of the location-determining device 15' are illustrated plotted against the distance D.

An estimation 38, determined by the location-determining device 36, of the relative position of the motor vehicle 10 with respect to the charging position 23 can firstly be transmitted to the odometry device 32. The respectably determined relative position can then be compared 39 with the charging position 23 in a fall-run phase between the location-determining device 36 and the odometry device 32.

When a first distance D1 is undershot, problems can occur with respect to the accuracy of the location determination by means of the location-determining device 36. Here, the odometry device 32 can then continue to be used for the further guidance of the motor vehicle 10. With a distance D2, the final positioning into the charging position 23 can then occur by means of the location-determining device 15' on the basis of the evaluation of the coupling factor Q. Comparison 39' of the odometry device 32 and of the location-determining device 15' is also possible here.

The motor vehicle 10 can then be guided into a transition region 40 between D1 and D2 by means of the odometry device 32.

Field distortion, for example owing to a higher proportion of electromagnetic material in the surroundings or in the motor vehicle 10, can be compensated by the respective comparison 39, 39'. Accordingly, in this region the weighting of the results from the rotational position sensors 33 and a steering angle sensor of the steering wheel 34 can be increased.

The measurements of the four systems described (transceiver unit 30, location-determining devices 36 and 15' as well as odometry device 32) can occur at time intervals of milliseconds. As a result, it is also possible to carry out plausibility checking of the determined estimations of the relative position by means of the comparisons 39, 39' of the previous location-determining data of the estimations of the relative position. For this, all the location-determining data can be provided in one timestamp. This serves not only to produce a history, but, in particular, this is advantageously used for synchronising the various systems with one another.

Therefore, plausibility tests can be carried out in the regions in which the ranges of the individual systems overlap. For example, the WiFi system of the transmitter 27 with the largest range still supplies location-determining data if the vehicle is already using the effective range of the location-determining device 36. Therefore, the estimations, determined with the two systems, of the relative position with respect to one another and with the results, for example of the rotational speed sensors and of the rotational angle sensor, can be compared with one another.

At the latest within the range of the location-determining device 36, it can be determined which of the possible empty charging spaces of the parking area 16 the motor vehicle 10 is to be steered toward. Since the motor vehicle 10 can also emit a signal with an identification number of the motor vehicle 10 by means of the transceiver unit, when a plurality of motor vehicles arrive at a parking area 26 with a plurality of charging stations 16 it can be determined which charging station 16 which motor vehicle 10 is steered toward or at which charging station 16 it is positioned.

The described method can be carried out with a sensor system which can also be used for other functionalities of the motor vehicle 10, for example for driver assistance during driving on the road 25. Therefore, this sensor system is assigned a double function, which constitutes a particularly efficient use of the sensor system.

Overall, the example shows how by means of the invention positioning in the case of inductive charging is made possible over a wide range.

LIST OF REFERENCE SIGNS

10 Motor vehicle
11 Electric machine
12 Battery
13 Charging system
14 Reception coil
15 Charger
15' Second location-determining device
16 Charging station
17 Transmission coil
18 Floor or ground
19 Power electronics system
20 Alternating current
21 Public supply grid
22 Magnetic alternating field
23 Charging position
24 Control device
25 Road
26 Parking area
27 Transmitter
28 Radio signal
29 WLAN radio module
30 Transceiver unit
31 Direction
32 Odometry device
33 Rotational position sensor
34 Steering wheel
35 Movement
36 First location-determining device
36' Receiver
36" Transmitter unit
37 Activity phase
38 Relative Position
39 Comparison
39' Comparison
40 Transition region
D Distance
D1 First distance
D2 Second distance
Location-determining signal
Q Coupling factor

The invention claimed is:

1. A method for guiding a motor vehicle into a charging position at an inductive charging station, the method comprising:
    as the vehicle approaches the charging position, determining with a control device of the motor vehicle a relative position of the motor vehicle with respect to the charging position, by:
    determining the relative position at least up to a first distance from the charging station by way of a first location-determining device;
    starting from a second distance from the charging station and up to the charging position, determining the relative position by way of a second location-determining device; and
    estimating the relative position at least in a transition region between the first distance and the second distance on the basis of the motor vehicle's own movement, by way of an odometry device of the vehicle.

2. The method according to claim 1, which comprises determining the relative position by the first location-determining device in a radio-based fashion.

3. The method according to claim 2, wherein the step of determining the relative position comprises emitting, from the first location-determining device, in each case one radio signal with a predetermined transmission field strength by way of two transmitter units and subsequently receiving a respective value of a reception field strength of the radio signals from a measuring receiver, which has a predetermined relative position with respect to the charging position, and determining with the first location-determining device the location of the measuring receiver as a function of the received values and on a basis of a trilateration.

4. The method according to claim 1, wherein the second location-determining device determines the relative position by generating a coupling signal which is dependent on a coupling factor of an inductive coupling between a receiver coil of the motor vehicle and a transmission coil of the charging station, and determines a gradient of the coupling signal during the motor vehicle's own movement.

5. The method according to claim 1, wherein the odometry device receives an initial estimation of the relative position from the first detection device.

6. The method according to claim 1, which comprises, before the first distance is reached, checking a change in the relative position which is determined by the first location-determining device in each case for a predetermined plausibility criterion by way of the odometry device on the basis of the vehicle's determined own movement and/or an own movement which is determined by the odometry device by way of the first location-determining device.

7. The method according to claim 1, which comprises, after the second distance is undershot, determining with the second location-determining device distance from the charging position or a coupling factor and determining a direction of the charging position by way of the odometry device.

8. The method according to claim 1, which comprises determining a presence of the charging station based on a radio signal from a vehicle-external transmitter.

9. The method according to claim 8, which comprises receiving an absolute Geo position of the charging station by way of the radio signal.

10. The method according to claim 8, which comprises determining a location of the transmitter based on the radio signal, and guiding the motor vehicle in a direction with respect to the transmitter up to the first location-determining device which determines the relative position of the charging station for the first time.

11. A control device for a motor vehicle, the control device being configured to couple to a first location-determining device, to a second location-determining device, and to an odometry device, and said control device having a processor configured to carry out the method according to claim 1.

12. A motor vehicle, comprising:
- a first location-determining device, a second location-determining device, and an odometry device;
- a control device configured to communicate with said first location-determining device, with said second location-determining device, and with said odometry device; and
- said control device having a processor configured to carry out the method according to claim 1.

* * * * *